United States Patent Office 2,923,753
Patented Feb. 2, 1960

2,923,753

PROCESS FOR PROTECTING NATURAL RUBBER AGAINST DETERIORATION BY OXIDATION AND COMPOSITION FORMED THEREFROM

Boris Nicholas Leyland and Ronald Lee Stafford, Manchester, England, assignors to Imperial Chemical Industries Limited, London, England, a corporation of Great Britain No Drawing. Application December 22, 1955
Serial No. 554,613

Claims priority, application Great Britain
December 31, 1954

21 Claims. (Cl. 260—752)

This invention relates to rubber antioxidant mixtures and their application to natural rubber in order to protect the rubber against deterioration by oxidation, both before and after vulcanisation, especially in the presence of copper or manganese.

According to the present invention we provide a process for protecting natural rubber against deterioration by oxidation, especially in the presence of copper or manganese, which comprises incorporating into the rubber, at any suitable stage before curing, at least one mercaptoarimidazole and at least one phenol containing at least one tertiary alkyl or alkylcycloalkyl radical having from 4 to 8 carbon atoms.

The mercaptoarimidazole may be used as such or in the form of its metal salt, for example its zinc, calcium or magnesium salt. The preferred mercaptoarimidazole is 2-mercaptobenzimidazole but others may be used, for example 2:2'-dibenzimidazyl disulphide.

We are aware that it has already been proposed to use mixtures of antioxidants generally with mercaptoarimidazoles in order to enhance the antioxidant effect. However it has not hitherto been observed that any special effect with respect to oxidation in the presence of copper or manganese is obtained and it has not been proposed to use mixtures of the phenols of our invention with mercaptoarimidazoles. We have discovered that such mixtures have an unexpected, outstanding effect on the oxidation of natural rubber in the presence of copper or manganese and our present invention is based upon this discovery.

Phenols that can be used in the process of this invention include those described in U.K. specifications Nos. 677,584, 719,101, 728,291, 723,838, 732,928 and 749,450; they may be, for example, bis(2-hydroxy-3-tert.-butyl-5-methylphenyl)-methane, bis[2-hydroxy-3-(α-methylcyclohexyl)-5-methylphenyl]-methane, bis(2-hydroxy-3-tert.-butyl-5-ethylphenyl)-methane, 2:2'-dihydroxy-3-tert.-octyl-3'-methyl-5:5:'-dimethyl-diphenylmethane, 2:2'-dihydroxy-3-tert.-butyl-3'-(α-methylcyclohexyl)-5:5'-dimethyldiphenylmethane, 2:2'-dyhydroxy-3:3'-di-tert.-butyl-5:5'-dimethyl-diphenyl-α:α-butane, 2:6-dimethyl-4-tert.-butyl-phenol, 2:6-di-di-tert.-butyl-4-methylphenol, 2-(α-methylcyclohexyl)-4:6-dimethylphenol or the metal salts thereof.

The proportion of mercaptoarimidazole to be used in the process of this invention may be from about 50% to about 200% of the weight of the phenol; preferably the proportion is about 100%. The amount of the combined agents used in the rubber is conveniently from 0.5% to 4.0% of the weight of the rubber hydrocarbon.

The efficacy of the process of this invention may be even further enhanced by the further incorporation into the rubber of a copper-sequestering agent, for example ethylene diamine tetracetic acid or a metal salt thereof, disalicylal alkylenediamines, 8-hydroxyquinoline or p-aminophenol. However the phenolic antioxidants described and their mixtures with the mercaptoarimidazoles give compounds which do not stain on exposure to light and when it is desired to retain this advantage the copper sequestering agents 8-hydroxyquinoline and p-aminophenol should not be used. Suitable proportions of these agents are from 3% to 10% of the total weight of the copper-inhibiting system. If it is desired to retain the advantage of a non-staining compound then the upper limit of 10% should not be exceeded in the case of the disalicylal alkylenediamines.

The agents may be added to the rubber mix singly or in combination. In the latter case it is convenient to use the agents as a preformed mixture and such pre-formed mixtures of mercaptoarimidazole, phenol containing at least one tertiary alkyl or alkylcycloalkyl radical having from 4 to 8 carbon atoms and, optionally, copper-sequestering agent form a further feature of this invention.

The invention is illustrated but not limited by the following examples, in which parts and percentages are by weight.

*Example 1*

Vulcanisable rubber compounds were made up by the conventional methods according to the following formulae in which the parts are by weight.

| Mix | A | B | C | D | E | F |
|---|---|---|---|---|---|---|
| Pale crepe rubber | 100 | 100 | 100 | 100 | 100 | 100 |
| Zinc oxide | 10 | 10 | 10 | 10 | 10 | 10 |
| Blanc fixe | 75 | 75 | 75 | 75 | 75 | 75 |
| Stearic acid | 1 | 1 | 1 | 1 | 1 | 1 |
| Sulphur | 3 | 3 | 3 | 3 | 3 | 3 |
| Copper stearate | 0.2 | 0.2 | 0.2 | 0.2 | 0.2 | 0.2 |
| Diphenyl guanidine | 0.5 | 0.5 | 0.5 | 0.5 | 0.5 | 0.5 |
| bis[2-hydroxy-3-tert.-butyl-5-methylphenyl]-methane | 2 | 1 | | | | |
| bis[2-hydroxy-3-(α-methylcyclohexyl)-5-methylphenyl]methane | | | 2 | 1 | | |
| bis(2-hydroxy-3-tert.-butyl-5-ethylpheny)-methane | | | | | 2 | 1 |
| 2-mercaptobenzimidazole | | 1 | | 1 | | 1 |

The mixes were vulcanised in sheets not greater than 0.8 mm. thick for 150 minutes at 141° C. The antioxidant effect was measured by observing the time in hours to absorb a given amount of oxygen. The sheet was enclosed in a glass cell maintained at 90° C. and containing oxygen. The amount of oxygen absorbed was calculated from the rise of mercury in a simple manometer tube attached to the glass cell.

| Mix | A | B | C | D | E | F |
|---|---|---|---|---|---|---|
| Time in hours to attain O₂-uptake of: | | | | | | |
| 0.5% | 31.8 | 36.6 | 26.6 | 30.7 | 18 | 25 |
| 1.0% | 52.0 | 64.7 | 44.0 | 52.5 | 32 | 46.5 |

*Example 2*

Vulcanisable rubber compounds were made up by the conventional methods according to the following formulae in which the parts are by weight.

| Mix | G | H | J | K |
|---|---|---|---|---|
| Pale crepe rubber | 100 | 100 | 100 | 100 |
| Zinc oxide | 10 | 10 | 10 | 10 |
| Blanc fixe | 75 | 75 | 75 | 75 |
| Stearic acid | 1 | 1 | 1 | 1 |
| Sulphur | 3 | 3 | 3 | 3 |
| Copper stearate | 0.2 | 0.2 | 0.2 | 0.2 |
| Diphenylguanidine | 0.5 | 0.5 | 0.5 | 0.5 |
| 2-(α-methylcyclohexyl)-4:6-dimethylphenol | 2 | 1 | | |
| 2:6-di-tert.-butyl-4-methylphenol | | | 2 | 1 |
| 2-mercaptobenzimidazole | | 1 | | 1 |

The mixes were vulcanised in sheets not greater than 0.8 mm. thick for 150 minutes at 141° C. and the antioxidant effect was measured as in Example 1.

| Mix | G | H | J | K |
|---|---|---|---|---|
| Time in hours to attain O₂-uptake of: | | | | |
| 0.5% | 17.5 | 21.0 | 12.5 | 22.2 |
| 1.0% | 30.2 | 38.6 | 24.0 | 40.0 |

*Example 3*

The following compounds were prepared in the conventional manner:

| Mix | L | M | N | O | P |
|---|---|---|---|---|---|
| Pale crepe rubber | 100 | 100 | 100 | 100 | 100 |
| Zinc oxide | 10 | 10 | 10 | 10 | 10 |
| Blanc fixe | 75 | 75 | 75 | 75 | 75 |
| Stearic acid | 1 | 1 | 1 | 1 | 1 |
| Titanium dioxide | 10 | 10 | 10 | 10 | 10 |
| Sulphur | 2.0 | 2.0 | 2.0 | 2.0 | 2.0 |
| Zinc diethyldithiocarbamate | 0.375 | 0.375 | 0.375 | 0.375 | 0.375 |
| Copper stearate | 0.2 | 0.2 | 0.2 | 0.2 | 0.2 |
| bis[2-hydroxy-3-(α-methylcyclohexyl)-5-methylphenyl]methane | 2 | 1 | | 1 | 0.95 |
| 2-mercaptobenzimidazole | | 1 | 0.9 | 0.9 | 0.95 |
| ethylene-bis(iminodiacetic acid) | | | 0.1 | | |
| disalicylal ethylene diamine | | | | 0.1 | |
| disodium salt of ethylene-bis(iminodiacetic acid) | | | | | 0.1 |

These mixes were vulcanised for 12 minutes at 125° C.

The antioxidant effect was measured by determining the tensile strengths of ring-shaped test pieces which had been aged for varying periods in an oxygen bomb under 300 p.s.i. oxygen pressure at 70° C.; curves were drawn for each mix, of tensile strength against duration of ageing and from the curves was interpolated the time in days for the tensile strength to fall to 50% of the unaged sample.

The following results were obtained:

| Mix | L | M | N | O | P |
|---|---|---|---|---|---|
| t-50% period in days | 8.4 | 14.5 | 15.0 | 12.5 | 15.4 |

*Example 4*

The following mixes were prepared in the conventional manner:

| Mix | Q | R |
|---|---|---|
| Pale crepe rubber | 100 | 100 |
| Zinc oxide | 10 | 10 |
| Blanc fixe | 75 | 75 |
| Stearic acid | 1 | 1 |
| Titanium dioxide | 10 | 10 |
| Sulphur | 2.5 | 2.5 |
| 2-mercaptobenzthiazole | 0.5 | 0.5 |
| bis[2-hydroxy-3-(α-methylcyclohexyl)-5-methylphenyl]methane | 2 | 1 |
| 2-mercaptobenzimidazole | | 0.9 |
| disalicylal ethylene diamine | | 0.1 |
| Copper stearate | 0.2 | 0.2 |

These mixes were vulcanised at 141° C. and the antioxidant effect was measured as in Example 3.

The following results were obtained:

| Mix | Q | R |
|---|---|---|
| t-50% period in days | 11.6 | 15.5 |

*Example 5*

The following mixes were prepared in the conventional manner:

| Mix | S | T | U | V | W | X | Y | Z |
|---|---|---|---|---|---|---|---|---|
| Pale crepe rubber | 100 | 100 | 100 | 100 | 100 | 100 | 100 | 100 |
| Zinc oxide | 10 | 10 | 10 | 10 | 10 | 10 | 10 | 10 |
| Blanc fixe | 75 | 75 | 75 | 75 | 75 | 75 | 75 | 75 |
| Stearic acid | 1 | 1 | 1 | 1 | 1 | 1 | 1 | 1 |
| Sulphur | 3.0 | 3.0 | 3.0 | 3.0 | 3.0 | 3.0 | 3.0 | 3.0 |
| Diphenylguanidine | 0.5 | 0.5 | 0.5 | 0.5 | 0.5 | 0.5 | 0.5 | 0.5 |
| Copper stearate | 0.2 | 0.2 | 0.2 | 0.2 | 0.2 | 0.2 | 0.2 | 0.2 |
| bis[(2-hydroxy-3-(α-methylcyclohexyl)-5-methylphenyl)]-methane | 2 | 1 | | | | | | |
| 2:6-tert.-butyl-4-methylphenol | | | 2 | 1 | | | | |
| bis(2-hydroxy-3-tert.-butyl-5-methylphenyl)-methane | | | | | 2 | 1 | | |
| 2(α-methylcyclohexyl)-4:6-dimethylphenol | | | | | | | 2 | 1 |
| 2-mercaptobenzimidazole | | 1 | | 1 | | 1 | | 1 |

The mixes were vulcanised for 75 minutes at 141° C. and tested by the bomb ageing method described in Example 3.

| Mix | S | T | U | V | W | X | Y | Z |
|---|---|---|---|---|---|---|---|---|
| t-50% period in days | 2.5 | 8.5 | 1.0 | 5.2 | 4.5 | 13.5 | 1.5 | 5.7 |

What we claim is:
1. Process for protecting natural rubber against deterioration by oxidation, in the presence of a member selected from the group consisting of copper and manganese, which comprises incorporating into the rubber, before curing,

(a) A sulfur compound, selected from the group consisting of 2-mercaptobenzimidazole, zinc, calcium, and magnesium salts of 2-mercaptobenzimidazole, and 2,2'-dibenzimidazyl disulfide; and
(b) A phenol having a substituent selected from the group consisting of tertiary alkyl radicals having from 4 to 8 carbon atoms and α-methylcyclohexyl.

2. The process of claim 1, wherein said sulfur compound is 2-mercaptobenzimidazole.
3. The process of claim 1, wherein the proportion of said sulfur compound is from 50% to 200% of the weight of said phenol.
4. The process of claim 3, wherein the proportion of said sulfur compound is about 100% of the weight of said phenol.
5. The process of claim 1, wherein the combined amount of (a) and (b) is from about 0.5% to about 4.0% by weight of the rubber.
6. Process for protecting natural rubber against deterioration by oxidation, in the presence of a member selected from the group consisting of copper and manganese, which comprises incorporation into the rubber, before curing, (a) A sulfur compound, selected from the group consisting of a 2-mercaptobenzimidazole, zinc, calcium, and magnesium salts of 2-mercaptobenzimidazole, and 2,2'-dibenzimidazyl disulfide;
(b) A phenol having a substituent selected from the group consisting of tertiary alkyl radicals having from 4 to 8 carbon atoms and α-methylcyclohexyl;

wherein the combined amount of (a) and (b) is from about 0.5% to 4% by weight of the rubber; and (c) A copper-sequestering agent in an amount of from about 3% to 10% by weight of the combined weight of (a), (b), and (c).

7. The process of claim 6, wherein said copper sequestering agent is selected from the group consisting of 8-hydroxy-quinoline, p-aminophenol, ethylene diamine tetracetic acid, alkali metal salts of ethylene diamine tetracetic acid, and disalicylal ethylene diamine.

8. The process of claim 6, wherein said copper sequestering agent is 8-hydroxyquinoline.

9. The process of claim 6, wherein said copper sequestering agent is p-aminophenol.

10. The process of claim 6, wherein said copper sequestering agent is ethylene diamine tetracetic acid.

11. The process of claim 6, wherein said copper sequestering agent is an alkali metal salt of ethylene diamine tetracetic acid.

12. The process of claim 6, wherein said cooper sequestering agent is disalicylal ethylene diamine.

13. A composition of natural rubber protected against oxidative deterioration which consists essentially of natural rubber, a member selected from the group consisting of copper and manganese, a sulfur compound selected from the group consisting of 2-mercaptobenzimidazole, zinc, calcium, and magnesium salts of 2-mercaptobenzimidazole and 2,2'-dibenzimidazyl disulfide, and a phenol having a substituent selected from the group consisting of tertiary alkyl radicals having from 4 to 8 carbon atoms and α-methylcyclohexyl.

14. A composition according to claim 13, and which also contains a copper sequestering agent.

15. The composition of claim 14, wherein said copper sequestering agent is selected from the group consisting of 8-hydroxyquinoline, p-aminophenol, ethylene diamine tetracetic acid, alkali metal salts of ethylene diamine tetracetic acid, and disalicylal ethylene diamine.

16. The composition of claim 15 wherein the combined amount present of said sulfur compound, said phenol and said copper-sequestering agent is from about 0.5% to about 4.0% by weight of the rubber of which combined amount 3% to 10% is the copper sequestering agent, and the proportion of said sulfur compound is from about 50% to about 200% of the weight of said phenol.

17. The composition of claim 15, wherein said copper sequestering agent is 8-hydroxyquinoline.

18. The composition of claim 15, wherein said copper sequestering agent is p-aminophenol.

19. The composition of claim 15, wherein said copper sequestering agent is ethylene diamine tetracetic acid.

20. The composition of claim 15, wherein said copper sequestering agent is an alkali metal salt of ethylene diamine tetracetic acid.

21. The composition of claim 15, wherein said copper sequestering agent is disalicylal ethylene diamine.

References Cited in the file of this patent

UNITED STATES PATENTS

| | | |
|---|---|---|
| 2,538,355 | Davis et al. | Jan. 16, 1951 |
| 2,560,028 | Kitchen et al. | July 10, 1951 |
| 2,560,744 | Rhines | July 17, 1951 |
| 2,727,014 | Harbison | Dec. 13, 1955 |